Figure 1:
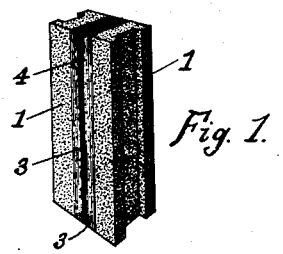

No. 896,802. PATENTED AUG. 25, 1908.
F. B. COOK.
ELECTRODE FOR LIGHTNING ARRESTERS.
APPLICATION FILED NOV. 27, 1907.

WITNESSES:
Frederick R. Parker.
Freeman Barney.

INVENTOR:
Frank B. Cook.

UNITED STATES PATENT OFFICE.

FRANK B. COOK, OF CHICAGO, ILLINOIS.

ELECTRODE FOR LIGHTNING-ARRESTERS.

No. 896,802.   Specification of Letters Patent.   Patented Aug. 25, 1908.

Application filed November 27, 1907. Serial No. 404,127.

*To all whom it may concern:*

Be it known that I, FRANK B. COOK, a citizen of the United States of America, residing at Chicago, in the county of Cook and State of Illinois, have invented new and useful Electrodes for Lightning-Arresters, of which the following is a specification, reference being had to the accompanying drawings, illustrating same.

My invention relates to high-potential electricity arresters, and more particularly to the electrodes employed in such arresters.

The principal objects of my invention are to provide increased efficiency in high-potential electricity arresters, by suitably treating the active surfaces of the electrodes of the arresters; and to provide a simple process for treating the active surfaces of the electrodes of such arresters to provide increased efficiency therein.

As will be hereinafter set forth the invention comprises the process of treating the electrodes of the arresters as well as the improved electrodes themselves.

I am aware that lightning arresters have been made in which the active surfaces of the electrodes were coated with an insulating material such as shellac, the said insulating coating serving as the dielectric between the electrodes to normally hold the latter apart and out of electrical connection with each other. This form of coating for the active surfaces of the electrodes is objectionable in certain electrical systems, such as telephone systems, where the voltage on which the arrester is supposed to cause a discharge to take place therethrough is comparatively low, generally about 500 volts, because it takes a very high voltage to puncture the shellac if the latter is put on sufficiently thick to properly insulate the electrodes from each other under normal conditions. I am also aware that electrodes of lightning arresters have been impregnated with a binding material and then the active surfaces of the electrodes ground off to remove the film of binding material and present a rough active surface, the entire process consisting of immersing the carbon electrodes in a hot solution of the binding material for about 30 minutes, drying the carbons for about 24 hours, then grinding the active surfaces of the carbons, washing the latter in water and then again drying them. One disadvantage in this treatment is the length of time required and the expense necessarily incurred in thus treating the electrodes. A still further objection is that the active surfaces of the electrodes, being ground off after the electrodes are impregnated with the binding material, are rough and therefore provide numerous indentures therein which may readily fill up with carbon dust or foreign particles, in handling, shipping, or utilizing the arresters, practically the same as in the ordinary carbon electrodes which are not treated in any manner but merely washed and thoroughly cleaned in the beginning.

In my present invention I treat the active surfaces of the electrodes of high-potential electricity arresters with a non-conducting adhesive material, preferably a cement, the body of which is celluloid, which is applied to the said active surfaces so as to merely fill up the indentures or low places in the said surfaces and leave the high points of the said surfaces exposed. This provides a smooth active surface for each electrode, which surface has no indentures therein to collect or hold carbon dust or foreign particles, and which at the same time has a great number of exposed points from which the discharges take place through the arrester. This coating does not form a dielectric to hold the electrodes out of electrical connection with each other, and therefore does not require a materially higher voltage to arc through the arrester than through a similar arrester in which the active surfaces are not treated with the nonconducting material. This coating being in the form of a cement holds the particles of a carbon electrode together and therefore prevents them from breaking off during the use of the arrester. The celluloid ash being a nonconductor does not form a low-resistance path through the arrester even after a severe discharge therethrough.

In the process which I employ for treating the electrodes of this invention the nonconducting binding material or cement is applied to the active surfaces of the electrodes with a brush and then wiped smoothly with a cloth before it has time to dry to any considerable extent. This process provides a very thin and uniform coating for the active surfaces of the electrodes. It can be readily seen that this process of treating the electrodes is a very simple one.

Figure 2:
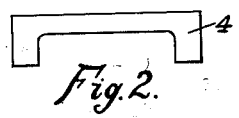
Figure 3:
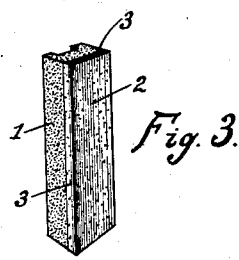

In the accompanying drawings, Figure 1 illustrates a high-potential electricity arrester in which the electrodes are treated according to my present invention; Fig. 2 shows a suitable dielectric to be used between the electrodes of the arrester shown in Fig. 1; and Fig. 3 is a perspective view of one of the electrodes of the arrester of Fig. 1 treated by the process of this invention.

Like characters refer to like parts in the several figures.

1 1 are the carbon electrodes of the arrester illustrated. Each electrode 1 is coated on its active surface 2 with the nonconducting adhesive material hereinbefore mentioned. Before applying the coating to the carbon 1 the latter is first thoroughly cleaned. Then the coating is applied with a brush after which the active surface 2 is wiped with a cloth to remove all of the coating except a very thin film thereof. This nonconducting material is also preferably applied to the sides of the carbon 1 as at 3 3, preferably as shown, so as to insulate the sides of the electrode adjacent to the active surface 2 thereof from foreign particles or objects, the said material being applied here thicker than on the active surface 2, so as to thoroughly insulate the side portions 3 3 back from the dielectric 4, as shown in Fig. 1.

I do not wish to limit this invention to all of the particular details herein described, as various departures therefrom may be made without departing from the scope of the appended claims.

Having thus described my invention, what I claim is:

1. An electrode for a high-potential electricity arrester, comprising a carbon block having nonconducting adhesive material applied to the active surface thereof so as to expose only the high portions of said active surface.

2. An electrode for a high-potential electricity arrester, comprising a conductive portion having a rough active surface, and nonconducting adhesive material applied to the said active surface so as to leave only the high portions of said surface exposed.

3. A carbon electrode for a high-potential electricity arrester, having a rough active surface, and nonconducting adhesive material applied to the said active surface to fill up the low portions of said surface and leave the high portions of said surface exposed.

4. An electrode for a high-potential electricity arrester, comprising a conductive portion the active surface of which is treated with a nonconducting adhesive material containing celluloid.

5. An electrode for a high-potential electricity arrester, comprising a piece of carbon the active surface of which is treated with a nonconducting adhesive material the body of which is celluloid.

6. An electrode for a high-potential electricity arrester, comprising a carbon block the active surface of which is treated with a nonconducting adhesive material the body of which is celluloid, so as to leave only the high points of said active surface exposed.

As inventor of the foregoing I hereunto subscribe my name in the presence of two subscribing witnesses, this 22nd day of November, 1907.

FRANK B. COOK.

Witnesses:
FREDERICK R. PARKER,
C. C. NEWBURN.